(12) United States Patent
Price

(10) Patent No.: US 7,168,252 B1
(45) Date of Patent: Jan. 30, 2007

(54) SOLAR HEATED GENERATOR

(76) Inventor: David E. Price, 232 David Price Rd., Cedartown, GA (US) 30125

( * ) Notice: Subject to any disclaimer, the term of this patent is extended or adjusted under 35 U.S.C. 154(b) by 0 days.

(21) Appl. No.: 11/311,520

(22) Filed: Dec. 19, 2005

(51) Int. Cl.
*B60K 16/00* (2006.01)
(52) U.S. Cl. .................................. 60/641.8; 60/641.11
(58) Field of Classification Search ............... 60/641.8, 60/641.9, 641.11, 641.12, 641.14
See application file for complete search history.

(56) References Cited

U.S. PATENT DOCUMENTS

| | | | |
|---|---|---|---|
| 3,903,700 A | | 9/1975 | Glickman |
| 4,047,385 A | | 9/1977 | Brinjevec |
| 4,051,680 A | * | 10/1977 | Hall ............................ 60/689 |
| 4,089,235 A | | 5/1978 | McWhorter |
| 4,122,680 A | * | 10/1978 | Isshiki et al. .................. 60/649 |
| 4,148,300 A | * | 4/1979 | Kaufman, Sr. ............... 126/684 |
| 4,249,083 A | | 2/1981 | Bitterly |
| 4,259,836 A | | 4/1981 | Finckh |
| 4,398,391 A | * | 8/1983 | English, Jr. ............... 60/641.15 |
| 4,438,630 A | * | 3/1984 | Rowe .......................... 60/676 |
| 4,562,828 A | | 1/1986 | Koskela |
| 4,841,731 A | | 6/1989 | Tindell |
| 4,893,611 A | * | 1/1990 | Kleinwachter ............... 126/586 |
| 4,918,938 A | * | 4/1990 | De Forest et al. ......... 62/238.6 |
| 5,622,605 A | * | 4/1997 | Simpson et al. ............... 203/10 |

* cited by examiner

*Primary Examiner*—Hoang Nguyen

(57) ABSTRACT

A system for producing electricity includes a boiler unit which has a lens mounted thereon in a position to concentrate solar rays onto fluid contained in the boiler unit. A conduit system has an inlet end fluidically connected to the boiler unit to receive heated fluid therefrom and conduct the heated fluid to and through a turbine which produces electricity as a result of the heated fluid passing therethrough. The conduit system further fluidically connects an exit end of the turbine to a heat exchanger unit which contains a fluid that is heated by the fluid exhausted from the turbine. The fluid heated in the heat exchanger unit is conducted via the conduit system back to the turbine to assist the turbine in producing electricity.

1 Claim, 2 Drawing Sheets

SOLAR HEATED GENERATOR

TECHNICAL FIELD OF THE INVENTION

The present invention relates to apparatus and methods for converting solar energy into electrical energy and particularly relates to the generation of hydroelectricity from solar energy.

BACKGROUND OF THE INVENTION

The world has become increasingly aware of the scarcity of fuel including, particularly, the fossil fuels, gas and oil. Prior systems for producing electrical power are ecologically destructive, having an adverse impact on the environment either because of their prodigious consumption of irreplaceable fossil fuels, or because of an adverse impact on the environment caused by their combustion of fossil fuels.

At the same time the world has become increasingly aware of the energy available from the sun, particularly, in those areas where there is a high percentage of days throughout the year when the sun is available for heating purposes and for other energy available in the sun's spectrum. Therefore, attempts have been made to use the sun's energy either to heat dwellings or to generate electricity through some form of conversion device, such as a photovoltaic cell or thermocouple. These attempts, however, have several disadvantage. However, because solar power has so many advantages, a great deal of attention has been paid to the utilization of solar energy Accordingly, various devices have been proposed and constructed for converting the heat energy from the sun to electrical energy and in fact attention is being increasingly focused on such devices, in view of the world energy crisis. One such device is described and illustrated in U.S. Pat. No. 2,969,637. As disclosed in that patent, a fluid flows through a solar heat accumulator where it is heated and expanded and thereafter passed through a turbine. The turbine drives an electrical generator which produces electricity. The heated fluid passes through a condenser wherein the heat extracted from the fluid returning to the reservoir is stored in water which is periodically supplied to the solar heat accumulator during periods when the solar energy is interrupted. A system of this type, however, appears to have a very low efficiency particularly since the heat stored in the water, in anticipation of an interruption of the solar energy, is readily dissipated. Also, the large number of pumps and motors in the system disclosed in that patent, necessary to operate that system, would appear to utilize a large portion of the electrical energy produced whereby the system appears only marginally practical or economical.

Since one of the principal purposes of the use of solar energy is to improve efficiency, any system or loop that can be used to increase the overall efficiency of such a system is likely to improve the system. Therefore, there is a need for a system that will improve the efficiency of an electrical generator plant that utilizes solar power.

SUMMARY OF THE INVENTION

The above-discussed disadvantages of the prior art are overcome by a system which passes the rays of the sun through a lens which focuses these rays into a focal point of high heat intensity. The focused rays of the sun are used to convert water to steam which powers a dynamo or turbine for the manufacture of electrical power. Steam exhausted from the turbine is passed through a heat exchanger to produce heated water that is directed back to the turbine and is used to augment the power generation of the turbine. In this manner, the efficiency of the system is increased.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 1:
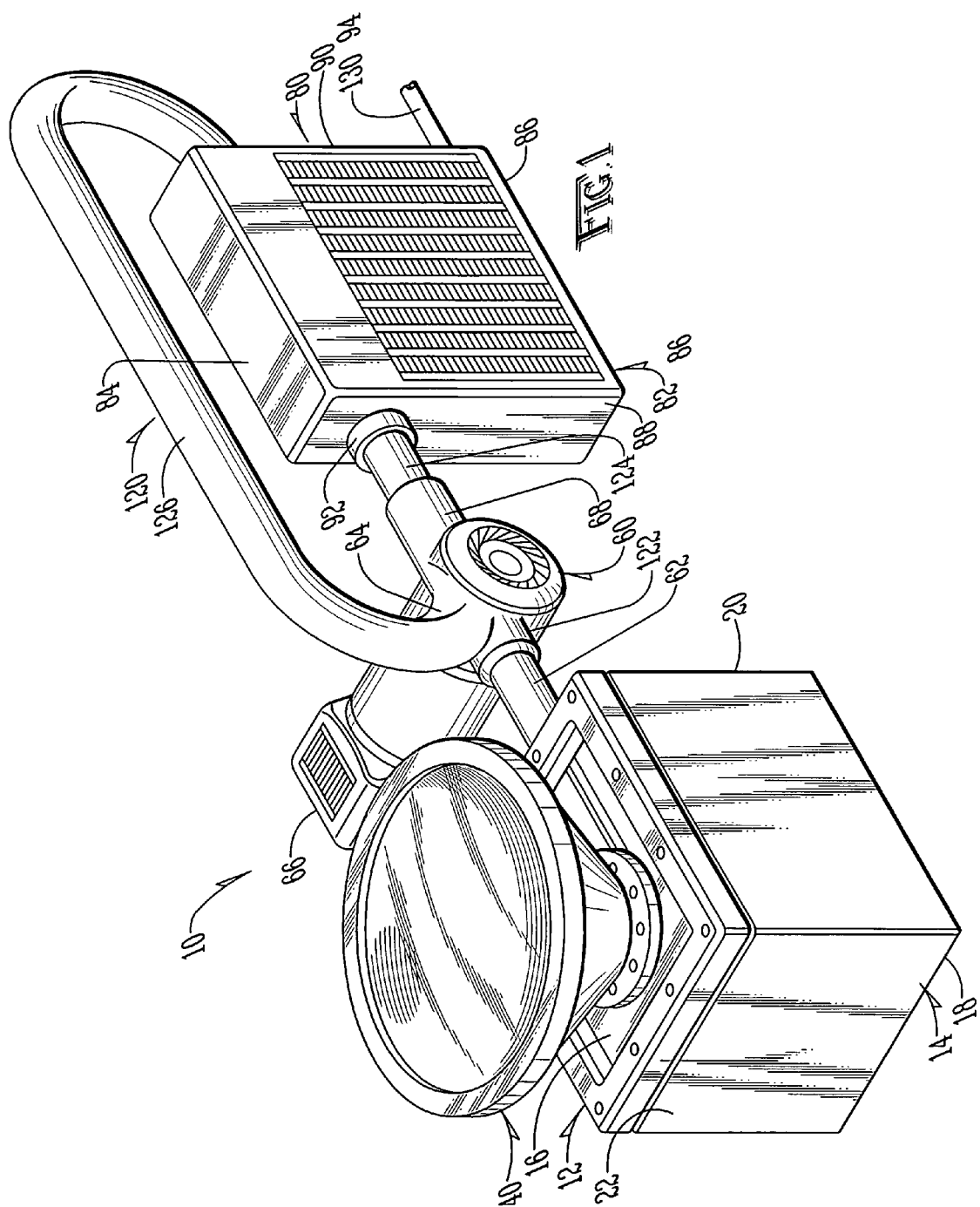
FIG. 1 is a perspective view of an electrical power generator system that utilizes solar power and which includes a system for improving the efficiency thereof embodying the present invention.
Figure 2:
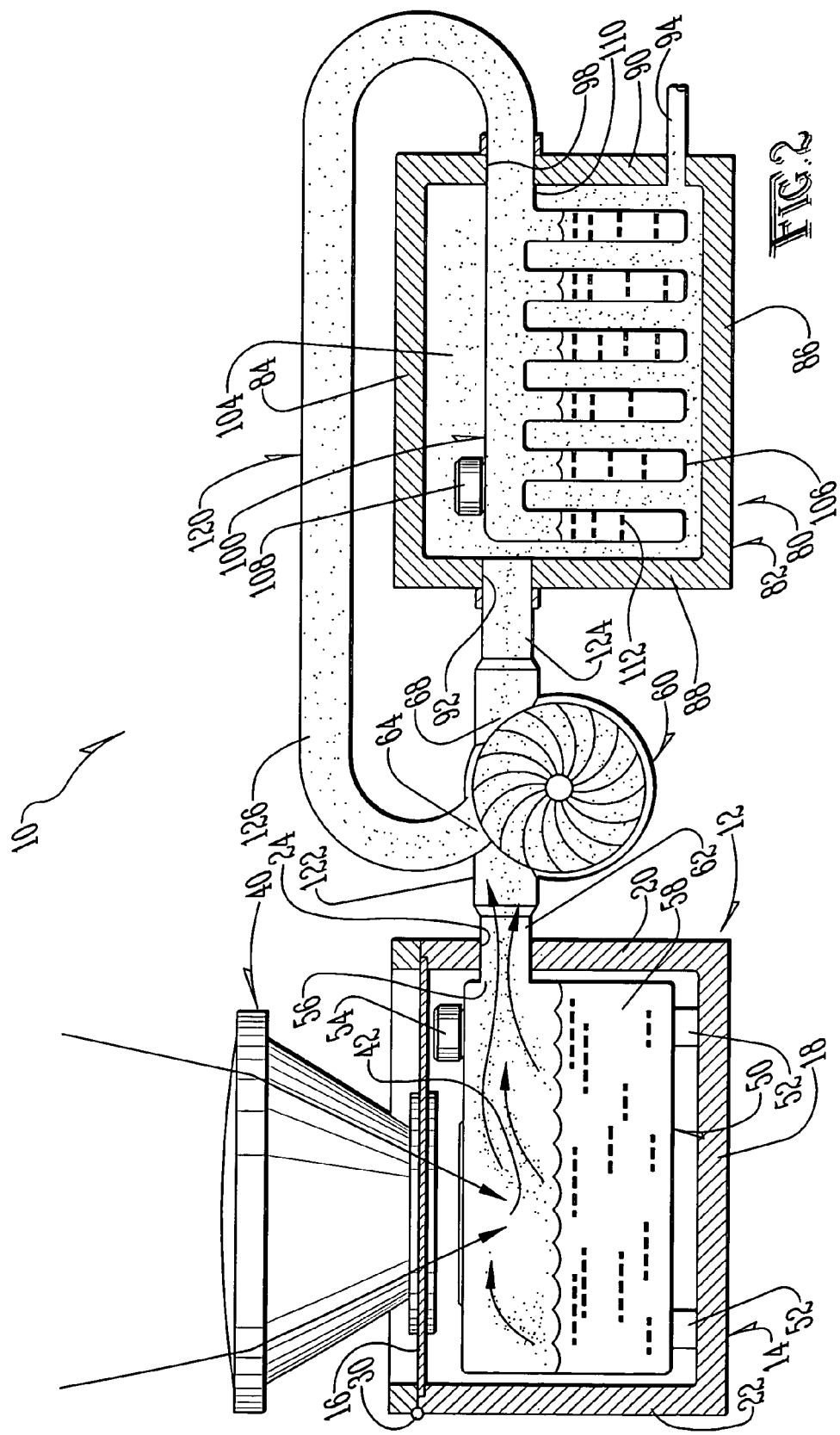
FIG. 2 is a schematic showing the system embodying the present invention.

Referring to the figures, it can be understood that the present invention is embodied in a power generator 10 which uses solar power. Power generator 10 comprises a boiler unit 12 which includes a housing 14 having a first surface 16 which is a top surface when the housing is in a use orientation as shown in FIG. 1, and a second surface 18 which is a bottom surface when the housing is in the use orientation. Housing 14 further includes a first side wall 20 connecting the first and second surfaces and a second side wall 22 connecting the first and second surfaces. Housing 14 is hollow, and a port 24 is defined in first side wall 20.

A hinge element 30 hingeably connects first surface to second side wall 22 so the housing can be opened and closed for purposes that will be understood from the following discussion. A light focusing lens unit 40 is mounted on first surface 16 and includes a focal point 42 located inside the housing whereby solar energy is focused at the focal point. The lens 40 may be sized large enough to concentrate sunlight to turn a turbine as described in more detail below. The lens 40 has a convex surface shaped like a magnifying glass to concentrate sunlight at a focal point.

A fluid container 50 is located inside the housing when in use. Fluid container 50 includes container supporting elements 52 on one side thereof for supporting the fluid container inside the housing. Container 50 further includes a fluid filling port 54 and a fluid outlet port 56.

A first vaporizable fluid 58, such as water or the like, is contained in the fluid container and is placed into that fluid container via port 54 after which the fluid container is positioned inside housing 14 via an open top after top surface 16 is hingeably moved out of the way. In this manner, fluid container 50 can be filled for use, cleaned or the like.

A turbine unit 60 includes a fluid inlet port 62, a fluid flow passage 64 and a converter unit 66 which converts energy associated with fluid flowing through the fluid flow passage into electrical output in a manner well known to those skilled in the turbine generator art. Turbine unit 60 further includes a fluid outlet port 68.

A heat exchanger unit 80 includes a housing 82 which has a first surface 84 that is a top surface when the heat exchanger unit is in a use orientation as shown in FIG. 1, a second surface 86 which is a bottom surface when the heat exchanger unit is in the use orientation, a first side wall 88 which connects first surface 84 to second surface 86, a second side wall 90 which connects first surface 84 to second surface 86. A fluid inlet port 92 is defined in first side wall 88, a steam exhaust port 94 is defined through second side wall 90 at a location near second surface 86, and a passage 98 is defined through second side wall 90 near first surface 84.

A fin unit 100 is located in housing 82 of the heat exchanger unit and includes an in interior volume 104, a plurality of heat exchange surfaces, such as fin 106, a fluid inlet port 108 and a steam outlet port 110. A second vaporizable fluid 112 is contained in the fin unit.

A conduit system 120 fluidically interconnects the various parts of the system 10 and includes a first conduit 122 which is fluidically connected to the fluid outlet port 56 of the fluid container and which extends through port 24 defined in the first side wall of the housing of the boiler unit and is fluidically connected to fluid inlet port 62 of the turbine unit and conducts first fluid 58 from the boiler unit to the turbine unit.

A second conduit 124 fluidically connects fluid outlet port 68 of the turbine unit to fluid inlet port 92 of housing 82 of the heat exchanger unit. A third conduit 126 fluidically connects steam outlet port 98 of the fin unit to fluid inlet port 62 of the turbine unit. Third conduit 126 is connected to port 98 of the fin unit of the turbine unit. A drain conduit 130 is fluidically connected to steam exhaust port 94 of the heat exchanger unit.

Operation of the system can be understood from the foregoing description and thus will only be briefly presented. Solar energy is focused by the lens onto the fluid container which will contain a vaporizorable fluid, such as water, or the like. Heat will be generated to vaporize this fluid. Fluid vapor is conducted out of the container via the first fluid conduit to the turbine through which the vapor flows. As the vapor flows through the turbine, the flow energy associated with this fluid flow is translated into electrical energy in a manner well known in the turbine art. The fluid exits the turbine and is conducted by the second conduit to the interior of the heat exchanger housing. Vaporized fluid comes into heat transferring contact with the fin unit which contains a second fluid which is heated by the vapor flowing from the second conduit. The second fluid flows from the fin unit to the turbine unit via the third conduit where it is injected into the turbine unit. The second fluid assists in the operation of the turbine and then flows back to the heat exchanger unit via the second conduit. The first fluid flows out of the heat exchanger unit via the drain. The second fluid is placed into the fin unit via the inlet on the fin unit.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:
1. A power generator which uses solar power comprising:
A) a boiler unit which includes
   (1) a housing having a first surface which is a top surface when the housing is in a use orientation and a second surface which is a bottom surface when the housing is in the use orientation, a first side wall connecting the first and second surfaces, a second side wall connecting the first and second surfaces, the housing being hollow, and a port defined in the first side wall,
   (2) a hinge element hingeably connecting the first surface to the second side wall,
   (3) a light focusing lens unit mounted on the first surface and including a focal point located inside the housing whereby solar energy is focused at the focal point,
   (4) a fluid container located inside the housing when in use, the fluid container including
      (a) container supporting elements on one side thereof,
      (b) a fluid filling port, and
      (c) a fluid outlet port, and
   (5) a first vaporizable fluid contained in the fluid container;
B) a turbine unit which includes
   (1) a fluid inlet port,
   (2) a fluid flow passage,
   (3) a converter unit which converts energy associated with fluid flowing through the fluid flow passage into electrical output, and
   (3) a fluid outlet port;
C) a heat exchanger unit which includes
   (1) a housing having a first surface that is a top surface when the heat exchanger unit is in a use orientation, a second surface which is a bottom surface when the heat exchanger unit is in the use orientation, a first side wall connecting the first surface of the housing of the heat exchanger unit to the second surface of the housing of the heat exchanger unit, a second side wall connecting the first surface of the housing of the heat exchanger unit to the second surface of the housing of the heat exchanger unit, a fluid inlet port defined in the first side wall, a steam exhaust port defined through the second side wall at a location near the second surface of the housing of the heat exchanger unit, and a passage defined through the second side wall of the housing of the heat exchanger unit near the first surface of the housing of the heat exchanger unit,
   (2) a fin unit located in the housing of the heat exchanger unit and which includes an in interior volume, a plurality of heat exchange surfaces, a fluid inlet port and a steam outlet port, and
   (3) a second vaporizable fluid contained in the fin unit; and
D) a conduit system which includes
   (1) a first conduit fluidically connected to the fluid outlet port of the fluid container and extending through the port defined in the first side wall of the housing of the boiler unit and which is fluidically connected to the fluid inlet port of the turbine unit and conducting first fluid from the boiler unit to the turbine unit,
   (2) a second conduit fluidically connecting the fluid outlet port of the turbine unit to the fluid inlet port of the housing of the heat exchanger unit, and

(3) a third conduit fluidically connecting the steam outlet port of the fin unit to the fluid inlet port of the turbine unit, the third conduit passing through the passage defined through the second side wall of the housing of the heat exchanger unit near the first surface of the housing of the heat exchanger unit and conducting the second fluid from the fin unit to the turbine unit, and (4) a drain conduit fluidically connected to the passage defined through the second side wall of the housing of the heat exchanger unit near the first surface of the housing of the heat exchanger unit.

* * * * *